Patented June 29, 1954

2,682,542

UNITED STATES PATENT OFFICE 2,682,542

METHOD OF PREPARING 2-MERCAPTO-4-AMINOPYRIMIDINES

George H. Hitchings, Tuckahoe, and Peter Byrom Russell, Crestwood, N. Y., assignors to Burroughs Wellcome & Co. (U. S. A.) Inc., Tuckahoe, N. Y., a corporation of New York No Drawing. Application December 12, 1951, Serial No. 261,393

6 Claims. (Cl. 260—256.5)

This invention relates to an improved method for the preparation of pyrimidine compounds and more particularly to the formation of pyrimidine derivatives substituted with an amino group at the 4 position of the ring, and is a continuation-in-part of our applications Serial No. 33,677 and Serial No. 33,678, both now abandoned. Certain of these pyrimidines are of pharmaceutical interest.

Known methods for the preparation of 4-aminopyrimidine derivatives have presented substantial problems in view of the nearly equivalent reactivity of halogens and other substituents at the 2-4 positions of the pyrimidine ring which necessitates resort to difficult separation procedures and low yields. For example, the usual procedure for preparing cytosine suggested by Johnson and Hilbert (J. Am. Chem. Soc. 52, 1152 (1930) c. f. Levene and Bass, "The Nucleic Acids," New York 1931, p. 71) requires the conversion of uracil to dichloropyrimidine which is then reacted with ammonia producing an inseparable mixture of chloroaminopyrimidines. The latter mixture must be first converted to the methoxyaminopyrimidines which are then separated by fractional crystallization, and the 2-methoxy-4-aminopyrimidine demethylated to give the desired 2-hydroxy-4-aminopyrimidine.

It has been found that 4-aminopyrimidine derivatives may be prepared readily and without the difficulties previously encountered by the reaction of 2,4 mercaptopyrimidines with ammonia. The dimercaptopyrimidine derivatives are readily obtainable by the method described in U. S. Patent No. 2,415,793 of Hitchings and Elion, which in conjunction with the present discovered process provides a convenient route for the preparation of many valuable 4-aminopyrimidine derivatives. The method of the present invention may be represented by the equation

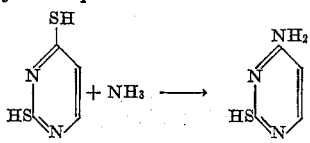

wherein the pyrimidine ring may contain various substituents or be entirely unsubstituted at the 5-6 positions. The reaction proceeds smoothly when the 2,4-dimercaptopyrimidine contains alkyl, monocyclic aryl and aralkyl radicals and even in cases where the 5-6 positions are joined in multiple ring compounds. When the 2,4-dimercaptopyrimidine compounds contain bulky substituents at the 5 position the reaction does not proceed readily with larger amines and in many cases is inhibited, presenting special problems. The reactions involving 2,4-dimercaptopyrimidines with higher amines and compounds formed thereby are the subject of copending applications by the present applicants.

Dimercaptopyrimidine derivatives which enter into the foregoing reactions are characterized by the tautomeric formulae

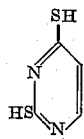

and

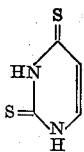

both of which undergo the same reaction with ammonia. Accordingly, the desired 2-mercapto-4-aminopyrimidine may be prepared by the selective action of ammonia with a 2,4-dimercaptopyrimidine containing different substituents at the 5-6 positions and whereby the 4-mercapto group is smoothly replaced by an amino group to give the corresponding 2-mercapto-4-amino derivative. In this reaction the 2-mercapto group is not easily replaced by an amino group thereby avoiding the inseparable mixtures produced by prior methods. The 2-mercapto group may readily be replaced by hydrogen, hydroxyl, alkyl mercapto and other groupings to form various compounds of pharmacological importance.

The desired 2-mercapto-4-aminopyrimidine compound may be readily formed by merely heating the selected reactants under suitable conditions of temperature and pressure until the reaction is completed. In many cases the 2,4-dimercaptopyrimidine derivatives react readily at temperatures of around 100° to give yields of from 80 to 90% of the corresponding 4-amino derivative. The reaction must be carried out in a sealed reaction vessel under the appropriate conditions of temperature and pressure.

A considerable excess of amine is added to the reaction mixture. Suitable proportions for carrying out the reaction may be in general about three mols of the base to about one mol of the 2,4-dimercaptopyrimidine derivative. The mixture becomes homogeneous at once with the evolution of heat due to initial salt formation. Application of heat is usually continued for a period of about three hours to complete the reaction.

The desired 2-mercapto-4-aminopyrimidine compound may be isolated from the reaction mixture by a number of methods including simple filtration from solution, evaporation of the solution to dryness, followed by crystallization from water or alcohol and simple precipitation of the material from solution with water or in some cases by removal of the excess base from the reaction mixture with ether. The preferred method of isolating the product will depend largely on the physical properties of the particular base used in the reaction.

The following examples illustrate specific instances of the various applications in accordance with the present invention.

EXAMPLE 1

1.5 g. of 5-ethyldithiouracil was dissolved in 15 ccs. of a 33 percent aqueous ammonia solution and heated in a bomb at 100° for about three hours. When the tube was opened, the contents including the reaction products was evaporated to dryness, dissolved and recrystallized from a hot aqueous solution to recover the 2-mercapto-5-ethyl-4-aminopyrimidine in 70 percent yield.

EXAMPLE 2

5.5 gms. of 2,4-dimercapto-5-methylpyrimidine was dissolved and heated in 85 ccs. of concentrated ammonia in a sealed tube for 24 hours at 100° and the reaction mixture cooled and filtered. The product was recrystallized several times from aqueous solution to give an 85 percent yield of 2-mercapto-5-ethyl-4-aminopyrimidine. Melting point 273–274° (dec.).

EXAMPLE 3

2-mercapto-5-benzyl-4-aminopyrimidine was prepared from 2,4-dimercapto-5-benzylpyrimidine by the procedure described in Example 2.

EXAMPLE 4

2,4-mercapto-6-aminoquinazoline was heated on a steam bath for two hours with 100 ccs. of concentrated ammonium hydroxide solution to yield on evaporation 65 percent of 2-mercapto-4,6-diaminoquinazoline.

EXAMPLE 5

*2-mercapto-4-amino-5-(2'4' dichlorophenoxy) pyrimidine.*—Six grams of 2,4-dimercapto-5-(2'4' dichlorophenoxy) pyrimidine was heated in a sealed vessel with 250 ml. of concentrated ammonium hydroxide solution at 120° C. for 24 hours. The tube contents was evaporated and extracted with 25 ml. of 5% aqueous ammonium hydroxide solution. The insoluble material was then dissolved in 1 N sodium hydroxide and precipitated by the addition of glacial acetic acid to pH 7. The yield was 3.0 g. of a white powder melting at 260–264° (dec.).

EXAMPLE 6

*2-mercapto-4-amino-5-(2' chloro-4' tert. butylphenoxy) pyrimidine.*—Ten grams of 2,4-dimercapto-5-(2' chloro-4' tert. butylphenoxy) pyrimidine was treated with ammonium hydroxide in a sealed vessel for 12 hours at 120° and the product was worked up as above. The reaction gas 3.4 g. of 2-mercapto-4-amino-5-(2' chloro-4'-tert. butylphenoxy) pyrimidine melting at 276–280° (dec.).

EXAMPLE 7

*2,4-dimercapto-5-(3',4' dimethylphenoxy) pyrimidine.*—This compound was prepared by the treatment of 7.6 grams of 2-mercapto-4-hydroxy-5 (3',4,-dimethylphenoxy) pyrimidine with 25 g. of $P_2S_5$ in 80 ml. of tetralin at 140° for 3 hours. This compound melted at 278–279° (dec.).

*2-mercapto-4-amino-5(3',4'-dimethylphenoxy) pyrimidine.*—Six grams of the dimercapto compound was treated as above with aqueous ammonia at 120° for 24 hours. After working up the product as described there was obtained 2.5 g. of the desired compound melting at 270–274° (dec.).

EXAMPLE 8

*2-mercapto-4-amino-5-(3' methyl-4'-chlorophenoxy) pyrimidine.*—Fifteen grams of the dimercapto compound was treated as above with ammonium hydroxide. The yield was 8 g. of mercapto-amino compound melting at 258–263° (dec.).

EXAMPLE 9

*2-mercapto-4-amino-5 (p-chlorophenoxy) pyrimidine.*—Eight grams of 2,4-dimercapto-5-(4' chlorophenoxy) pyrimidine was heated with 250 ml. of ammonium hydroxide at 120° for 16 hours. The product weighed 4.8 g. after purification by solution wih sodium hydroxide and precipitation with acetic acid. It melted at 255–259° (dec.).

EXAMPLE 10

*4-amino-2-mercapto-5 - phenoxypyrimidine.*—2,4-dimercapto-5-phenoxypyrimidine (5 g.) was dissolved in 200 ml. of concentrated ammonium hydroxide solution and heated at 120° for 26 hours. The solution was evaporated to dryness, the solid was leached with 20 ml. of 1 N ammonium hydroxide, and recrystallized from hot water. There was obtained 2.9 g. of 4-amino-2-mercapto-5-phenoxypyrimidine melting at 270° (dec.).

EXAMPLE 11

*4-amino-2-mercapto-6-methylpyrimidine.* — 2,4-dimercapto-6-methylpyrimidine 3.5 g. was dissolved in 100 ml. of concentrated ammonium hydroxide solution and heated in a sealed tube at 100° for 4 hours. The 4-amino-2-mercapto-6-methylpyrimidine was isolated as described above.

EXAMPLE 12

*4-amino-2-mercaptoquinazoline.*—In the same fashion 2,4-dithiolquinazoline reacted with concentrated ammonium hydroxide solution to yield 4-amino-2-mercapto quinazoline, melting point 290–293° C.

We claim:

1. A method of preparing a 2-mercapto-4-aminopyrimidine which comprises reacting a 2,4-dimercaptopyrimidine with ammonia.

2. A method of preparing a 5-alkyl-2-mercapto-4-aminopyrimidine which comprises reacting a 5-alkyl-2,4-dimercaptopyrimidine with ammonia.

3. A method of preparing a 5-aryl-2-mercapto-4-aminopyrimidine which comprises reacting a 5-aryl-2,4-dimercaptopyrimidine with ammonia.

4. A method of preparing a 5-aralkyl-2-mercapto-4-aminopyrimidine which comprises reacting a 5-aralkyl-2,4-dimercaptopyrimidine with ammonia.

5. The method of claim 1 wherein the mixture is heated for a period of from three to five hours.

6. The method of claim 1 wherein the mixture is heated in a sealed reaction vessel.

No references cited.